No. 619,947. Patented Feb. 21, 1899.
A. H. FEHR & J. W. LOVATT.
TOE WEIGHT FOR HORSES.
(Application filed July 15, 1898.)
(No Model.)
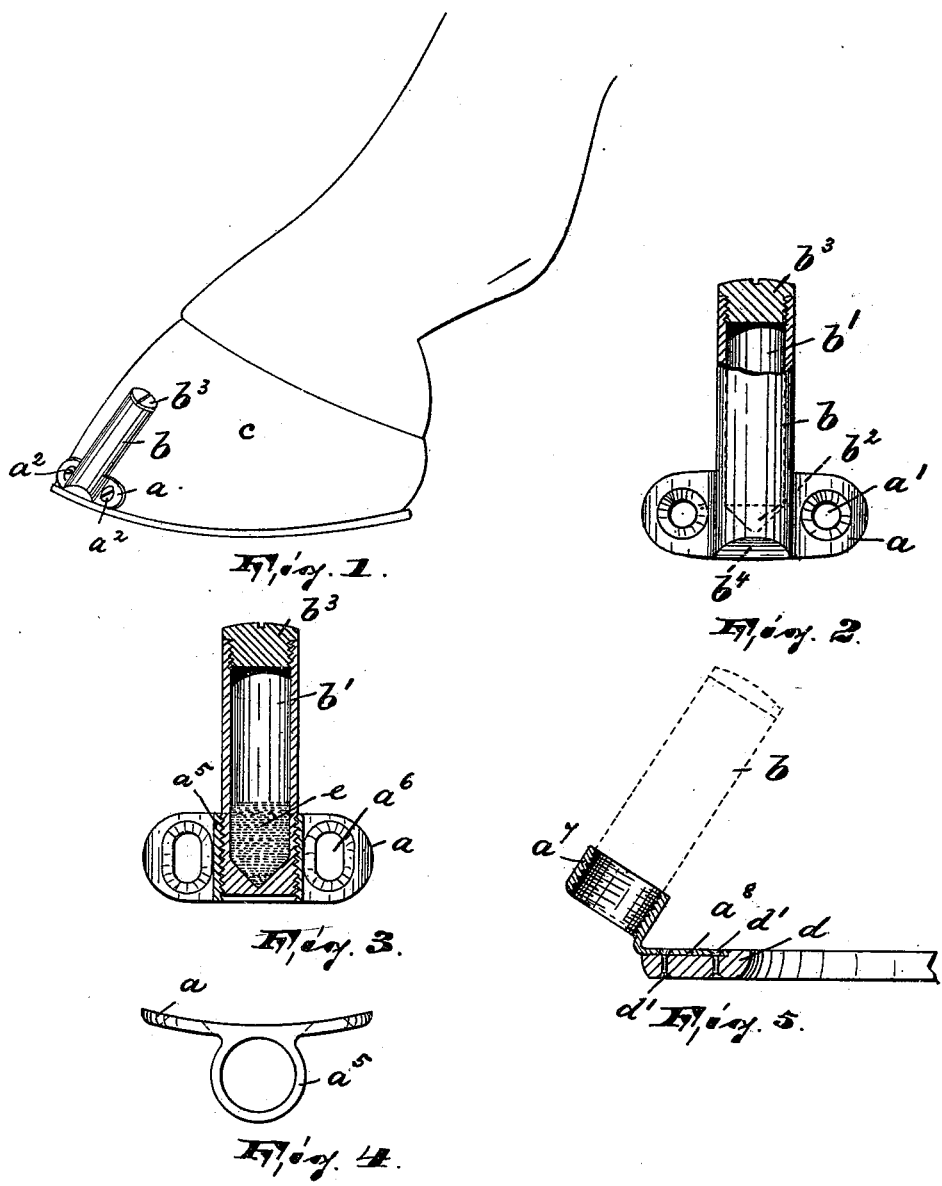
WITNESSES:
INVENTORS:
James Walter Lovatt
Albert Henry Fehr
BY Partner & Co
ATTORNEYS.

UNITED STATES PATENT OFFICE.

ALBERT HENRY FEHR AND JAMES WALTER LOVATT, OF BETHLEHEM, PENNSYLVANIA.

TOE-WEIGHT FOR HORSES.

SPECIFICATION forming part of Letters Patent No. 619,947, dated February 21, 1899.

Application filed July 15, 1898. Serial No. 686,001. (No model.)

*To all whom it may concern:*

Be it known that we, ALBERT HENRY FEHR and JAMES WALTER LOVATT, citizens of the United States, residing in Bethlehem, county of Northampton, and State of Pennsylvania, have invented certain new and useful Improvements in Toe-Weights for Horses; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

Our present invention relates to improvements in toe-weights for horses; and its object is to provide a strong and durable toe-weight which can be cheaply and easily manufactured and which is reliable and efficient in operation.

The invention consists in the improved toe-weight and in the combination and arrangement of the various parts, substantially as will be hereinafter more fully described and finally embodied in the clauses of the claim.

Referring to the accompanying drawings, in which like letters of reference indicate corresponding parts in each of the several views, Figure 1 illustrates our improved toe-weight secured to a horse's hoof; Fig. 2, an enlarged detail front elevation of the toe-weight with its upper portion shown in section; Fig. 3, a view similar to Fig. 2, illustrating a slight modification of the toe-weight; Fig. 4, a top plan view of the toe-weight-securing plate as shown in Fig. 3; and Fig. 5, a detail sectional view of a modified form of the toe-weight-securing plate, which latter form is used when the said toe-weight is to be carried by the shoe.

In said drawings, $a$ represents a curved plate provided with holes or openings $a'$ and adapted to be secured to the front of a horse's hoof $c$ and at or near the toe thereof by means of screws $a^2$ or in any desired manner. Secured to and integral with said plate $a$ is an upwardly-extending receptacle $b$, preferably cylindrical in cross-section, the vertical elongated bore or chamber $b'$ of which terminates at its lower or inner portion in a conical-shaped recess $b^2$, while its upper portion is internally threaded and is adapted to receive a screw-cap $b^3$ to thus close the bore or chamber for a purpose hereinafter stated. The lower front portion of said receptacle $b$ is beveled, as at $b^4$, so that the same cannot strike the ground or otherwise interfere with the traveling of the horse. The said receptacle $b$ is weighted by mercury, ($e$,) small shot, or other weighty substance, which is placed in the lower portion of the bore or chamber and is prevented from leaving the latter by means of the screw-cap $b^3$. On account of gravity the mercury, &c., will always try to occupy the lowermost portion of the bore or chamber $b'$, yet when the horse raises his foot when in motion the weight will at once be transferred to the opposite end of the receptacle, the sudden shifting of the weight tending to obviate his raising his foot high enough to hit his elbow. Now when the foot moves forward the mercury, &c., will return to its former position, thus assisting the horse in carrying his foot outward and giving him a more secure and uniform step.

In Figs. 1 and 2 the receptacle $b$ is illustrated as being integral with the plate $a$. In Figs. 3 and 4 the lower portion of said receptacle is externally screw-threaded and is adapted to be adjustably secured within the internally-screw-threaded annular ring $a^5$, the latter projecting from and integral with the plate $a$.

It must be further stated that instead of circular openings $a'$, as shown in Fig. 2, the plate $a$ can be provided with elongated openings $a^6$, as in Fig. 3, whereby the said plate and the receptacle carried thereby can be readily adjusted on the horse's hoof, as will be manifest.

In the modification illustrated in Fig. 5 the receptacle $b$ (shown in dotted lines) is adjustably secured within a ring $a^7$, provided with a rearwardly-extending flange or projection $a^8$, which latter is secured to the toe of the shoe or racing-plate $d$ by means of rivets $d'$ or in any desired manner.

The last-mentioned form is generally used when the wall of the horse's hoof is too brittle or thin and accordingly would not furnish a strong or firm support for the toe-weight.

We do not intend to limit ourselves to the precise construction, as shown and described, as various alterations can be made without changing the scope of our invention; but

What we claim as new, and desire to secure by Letters Patent, is—

1. A toe-weight for horses comprising a hollow receptacle, a shiftable weight contained therein, and a plate separably and adjustably connected with said receptacle and projecting, and adapted to be secured in position on the horse's hoof, each side of said receptacle, substantially as described.

2. A toe-weight for horses comprising a hollow cylindrical receptacle, a shiftable weight contained therein, a plate separably and adjustably connected with said receptacle at its lower end, and projecting each side of said receptacle, and securing-screws adapted to penetrate the projecting portions of said plate, substantially as described.

3. A toe-weight comprising a plate adapted to be secured to the horse's hoof and provided with a forwardly-projecting internally-screw-threaded ring, a hollow receptacle having its lower portion externally threaded and adjustably secured within said ring, a shiftable weight within said receptacle, and a cap removably arranged in the top portion of the receptacle, substantially as and for the purposes set forth.

4. A toe-weight for horses consisting of a securing-plate, an internally-threaded ring integrally connected to said plate, a cylindrical receptacle screwed into said ring and projecting upwardly therefrom, and a shiftable weight contained in said receptacle, substantially as described.

In testimony that we claim the foregoing we have hereunto set our hands this 24th day of June, 1898.

ALBERT HENRY FEHR.
JAMES WALTER LOVATT.

Witnesses:
O. E. GROMAN,
H. A. GROMAN.